Patented Aug. 24, 1948

2,447,611

UNITED STATES PATENT OFFICE 2,447,611

PRODUCTION OF SILOXANE RESINS

William R. Collings, Howard N. Fenn, and Herbert J. Fletcher, Midland, Mich., assignors to Dow Corning Corporation, Midland, Mich., a corporation of Michigan No Drawing. Application January 21, 1946, Serial No. 642,437

7 Claims. (Cl. 260—46.5)

The present invention relates to new synthetic resins, of the general class of organo-substituted poly siloxanes wherein the substituent organic groups are both methyl and aromatic radicals. The invention is particularly concerned with methyl phenyl siloxane resins and to the commercial production thereof. Such resins are composed of variously substituted organosilicon oxide units and belong to a class of condensation polymers popularly known as "silicones."

Siloxanes are conventionally prepared by the hydrolysis of organo-substituted silanes in which the silicon atom carries one or more organic radicals bound directly to it through a carbon to silicon linkage and one or more hydrolyzable groups as for example, halogen or alkoxy radicals.

Condensation to form the desirable highly polymeric organosilicon oxide products is usually carried out at least partially during the hydrolysis step, followed by a heating step to build up the polymer to the desired size, as indicated by viscosity or other property. In general, hydrolysis and condensation of functional organo-silanes of varying degrees of substitution produce siloxane polymers of widely varying character. Further, a mixture of the highly polymeric products resulting from the separate condensation of hydrolyzed silanes of different degrees of substitution with respect to the organic groups bound to the silicon through a carbon to silicon linkage, does not produce the same result as co-condensation thereof, since, in the co-condensed highly polymeric organo-silicon oxide product, the variously substituted organosilicon oxide units are portions of the same highly polymeric siloxane molecules. This results in a uniform product. Hydrolyzable unsubstituted silicon compounds, which may be present prior to such hydrolysis and condensation, can lead to unsubstituted portions of the polymeric siloxane molecules and can thereby modify both the chemical and physical properties of the resins.

It has been appreciated in the art, that it is possible to obtain liquid siloxane resins composed of a plurality of organosilicon oxide structural units, which liquid resins can be converted to solids by heating. Such cured siloxane resins, in general, are hydrophobic, insensitive to water, resistant to heat and are generally useful as resinous dielectrics. Particularly desirable are liquid siloxane resins which are sufficiently condensed that they may be used either alone, or in solutions which are reasonably concentrated, for impregnating fabrics, insulated coils or other electrical equipment, or for coating impervious or relatively impervious surfaces. It is also desirable that such siloxane resins should have sufficient body that substantial films are formed in impregnating or coating operations, and that they should cure in reasonably short times at not too high temperatures to non-tacky solids. Other specific physical properties of the resins, such as strength, flexibility and thermoplasticity may vary with the intended use.

Objects of the present invention are to provide improved methods for the preparation of siloxane resins. Other objects and advantages of the present invention will be apparent from the following description and the subjoined claims.

In accordance with a preferred form of this invention, siloxane resins are prepared from a mixture of hydrolyzable organo-silanes produced by interaction of methyl and phenyl Grignard reagents with silicon tetrachloride. The crude coupling product is separated by filtration from the insoluble magnesium salts, and is distilled to remove overhead silicon tetrachloride, and organosilicon chlorides in which the only organo radicals are methyl radicals, together with any organic solvents which may have been employed in the Grignard reaction. The residual mixed organosilicon chlorides are then conjointly hydrolyzed with the addition of a mono alkyl silicon trichloride, such as methyl silicon trichloride. The hydrolyzate is further condensed by heating to the desired body or viscosity. The bodied resinous product so produced can be cured to a non-tacky solid resin by heating after it has been applied as an impregnating or coating material.

Although the preferred form of the invention is embodied in the preparation of improved methyl phenyl siloxane resins, it may be employed advantageously and generally in the preparation of lower alkyl, aromatic poly siloxanes and particularly where the alkyl group contains less than 4 carbon atoms, and the aryl group is exemplified by phenyl, tolyl, benzyl, naphthyl, xenyl, or any other aromatic radical capable of forming a Grignard reagent.

The coupling of aromatic and lower alkyl radicals to silicon by carbon-silicon linkage may be effected by reacting upon silicon tetrachloride with Grignard reagents made from methyl and aromatic halides by any conventional procedure. Thus, the Grignard reagents may be preformed by contacting the respective halides with magnesium shavings suspended in ether and added, as such, to silicon tetrachloride, or they may be formed by interaction of magnesium and lower alkyl and aromatic halides in the presence of the silicon tetrachloride. Coupling the lower alkyl and aromatic Grignard reagents to the silicon tetrachloride may be effected either simultaneously or successively. Crude mixtures of the organo-chlorosilanes so obtained are useful in preparing siloxane resins when they are used in accordance with this invention.

The crude coupling mixture resulting from interaction of methyl magnesium chloride and phenyl magnesium chloride with silicon tetrachloride contains magnesium chloride suspended in a solution of unreacted silicon tetrachloride and the organosilicon chlorides in a solvent mixture of ether and an inert hydrocarbon diluent. The crude mixture can be hydrolyzed to form phenyl methyl poly siloxane resins but the presence of unreacted silicon tetrachloride during hydrolysis results in considerable losses of organosilicon oxide products carried down in insoluble precipitates. Silicon tetrachloride in the mixture for hydrolysis further tends toward promoting gel formation in the resin during storage. Dimethyl silicon dichloride and trimethyl silicon monochloride in the mixture are undesirable because of their tendency to confer softness and cheesiness in the resins or to produce slower curing resins of too great thermoplasticity.

We have found that phenyl methyl poly siloxane resins having a desirable combination of physical properties, as determined by their retention of flexibility in thin films at 250° C., their relatively fast curing time of 1 to 4 hours at 250° C. and their lack of volatile low polymeric siloxanes, are obtained most economically by employing substantially all the phenyl substituted silicon chlorides of the coupling mixture and eliminating all the methyl silicon chlorides except the CH₃SiCl₃.

The distribution of the type and kind of the organosilicon chlorides produced depends both upon the ratio of methyl to phenyl Grignard reagents used and upon the coupling ratio, i. e., the mol. ratio of the combined Grignard reagents to the silicon tetrachloride. The reaction conditions are preferably controlled so that the predominant organosilicon chloride containing two organo groups is phenyl methyl silicon dichloride. High proportions of the phenyl methyl silicon dichloride are obtained when the phenyl and methyl Grignard reagents are employed in substantially equal molecular amounts. Wide latitude is permissible in the relative proportions of the two principal organosilicon chlorides in the still residue namely, phenyl silicon trichloride and phenyl methyl silicon dichloride. Preferred resins are produced when the reaction product contains between 10 and 30 mol. per cent of phenyl silicon trichloride based on total phenyl and phenyl methyl silicon chlorides. For example, by simultaneously coupling, using a mixture containing equal molecular equivalents of methyl and phenyl Grignard reagents, at a coupling ratio of total Grignard reagent to SiCl₄ of 2.1 to 1, there is obtained a crude mixture containing 17.1 mol. per cent phenyl silicon trichloride, while at a coupling ratio of 1.6 to 1 there is obtained a mixture containing 26.4 mol. per cent phenyl silicon trichloride (both based on total phenyl and phenyl methyl silicon chlorides). In case the still residue contains a lower percentage of phenyl silicon trichloride than desired, some may be added.

The insoluble magnesium salts which are formed by interaction with the Grignard reagents are mechanically separated, as by filtering, preferably prior to distillation of the reaction product.

The low boiling constituents containing silicon tetrachloride and the silicon chlorides in which the only organo groups are methyl radicals are removed from the crude reaction mixture by vaporization, together with solvents. The cut is made at a sufficiently low temperature that the still residue will contain all the silicon halides having at least one phenyl radical. The cut can be made at any point between about 70° C. and 190° C., when the distillation is made at atmospheric pressure. Due to the large difference between the boiling points of the phenyl silicon chlorides and of silicon tetrachloride and the methyl silicon chlorides, a clean separation therebetween can be effected without resort to fractionation.

Commercially pure methyl silicon trichloride, which is substantially free of silicon tetrachloride and of dimethyl and trimethyl silicon chlorides, is added to the still residue, preferably in amount between 5 and 40 mol. per cent, based on total methyl and phenyl silicon trichlorides and methyl phenyl silicon dichloride. The overhead from the distillation may be purified to obtain in whole or in part the requisite methyl silicon trichloride. Likewise, methyl silicon trichloride from other sources may be employed.

The still residue and added methyl silicon trichloride are hydrolyzed and resinified by any appropriate procedure. Thus, the mixture may be added progressively to water in more than equivalent amount to effect hydrolysis. The hydrolyzate, which is insoluble in water, preferably is collected in a solvent, such as toluene. This oil layer may be separated from the aqueous hydrochloric acid layer and washed with water. The toluene solution of the resin may be filtered to remove any undissolved solids and the toluene then removed by distillation. Any residual water not mechanically separated during washing will be removed with the toluene as an azeotrope. The polymer so obtained may be bodied to a higher viscosity. The rate of the polymerization reaction which occurs during bodying may be increased by heating, by adding an acidic or basic catalyst, or by both. The resin so produced may be dissolved in a suitable solvent, such as toluene, to thin the resin to the extent desired.

*Example*

Two crude coupling products were prepared by simultaneously coupling methyl and phenyl Grignard reagents with silicon tetrachloride. The methyl and phenyl reagents were in equivalent amounts. The magnesium salts were separated by filtration. The low boiling materials, including the silicon tetrachloride and the methyl silicon chlorides, were removed from the coupling products by distillation. The composition of the still residue in per cent by weight was as follows:

| | |
|---|---:|
| Hydrocarbon solvent | 9.06 |
| PhSiCl₃ | 15.3 |
| PhMeSiCl₂ | 51.3 |
| PhMe₂SiCl | 1.9 |
| Higher boiling and residue | 22.0 |
| | 99.56 |

To 588.5 lbs. of still residue having the composition just given, there was added 166 lbs. of commercially pure methyl silicon trichloride. The mixture accordingly contained 13.7 mol. per cent of phenyl silicon trichloride, 50.7 mol. per cent of phenyl methyl silicon dichloride, and 35.6 mol. per cent of methyl silicon trichloride, based on total methyl, phenyl, and methyl phenyl silicon chlorides. The mixture was hydrolyzed in water by adding one fifth of the mixture to 80 gallons of toluene and 40 gallons of water with agitation. The chlorides were hydrolyzed by the water, and the hydrolyzate dissolved in the toluene. The aqueous hydrochloric acid produced was decanted from the toluene solution and replaced with another 40 gallons of water, following which an additional fifth of the mixed chlorides was hydrolyzed. This procedure was repeated until the total mixture was hydrolyzed. The toluene solution was then washed five times with water and filtered. The filtrate was concentrated to remove the toluene. A portion of the concentrated filtrate was heat-bodied at 175° C. in a steam jacketed kettle until the viscosity of a solution of the resin in an equal weight of toluene reached 40 to 50 centistokes, whereupon 10 per cent by weight of a mixed aromatic solvent, having a boiling range of about 173° to 208° C., was added to the resin. Heat-bodying was continued until the viscosity in 50 per cent solution was greater than 125 centistokes. The resin was then cooled rapidly and diluted with a mixed aromatic solvent of lower boiling range to a 50 per cent solution.

Another portion of the hydrolyzate was bodied to the point that in a 50 per cent solution in toluene it had a viscosity of 10 to 20 centistokes.

These resins cure by baking at about 250° C. for a short time. Sheet metal coated with a film of the resin which has been cured may be heated at 250° C. for over 100 hours without the resin coating failing when the sheet metal is bent around an eighth inch rod. These resins are useful for impregnating and sealing coils, motor stators, and air-cooled transformers, for varnishing cloth, tapes and sleeves made of glass fiber, and for securing mica to glass fiber cloth in the production of ground insulation. Equipment insulated with these resins may be operated at 175° C. continuously and at temperatures up to 250° C. periodically.

We claim:

1. The method of preparing organo-poly-siloxane resins from mixtures containing phenyl and methyl substituted silicon chlorides produced by interaction of silicon tetrachloride with phenyl and methyl Grignard reagents, and in which all of the chlorine substituted silicon atoms are subjected to reaction conditions both with the phenyl and the methyl Grignard reagents whereby phenyl and methyl radicals are coupled with silicon by carbon-silicon linkage, which comprises vaporizing silicon tetrachloride and the low boiling silicon chlorides in which the only organo radicals are methyl radicals from the crude reaction mixture leaving a residue containing the higher boiling silicon chlorides which contain at least one phenyl radical, hydrolyzing the still residue, hydrolyzing methyl silicon trichloride, and copolymerizing the hydrolysis products of said still residue and said methyl silicon trichloride, whereby a bodied resin is obtained.

2. The method defined in claim 1 in which the reaction mixture is the product of simultaneously coupling phenyl and methyl radicals with the silicon by the Grignard reaction.

3. The method defined in claim 1 in which the still residue and the methyl silicon trichloride are hydrolyzed in mixture.

4. The method of preparing siloxane resins from crude reaction mixtures containing phenyl and methyl substituted silicon chlorides produced by the Grignard reaction employing phenyl and methyl Grignard reagents, whereby phenyl and methyl radicals are coupled with silicon by carbon-silicon linkage, whereby silicon chlorides are produced which contain at least 1 phenyl and at least 1 methyl radical and which reaction mixture contains between 10 and 30 mol. per cent phenyl silicon trichloride, based on total phenyl and phenyl methyl silicon chlorides, which comprises vaporizing silicon tetrachloride and the low boiling silicon chlorides in which the only organo radiacals are methyl radicals from the crude reaction mixture leaving a residue containing the higher boiling silicon chlorides which contain at least one phenyl radical, hydrolyzing the still residue and between 5 and 40 mol. per cent of methyl silicon trichloride, based upon total methyl and phenyl silicon trichlorides and methyl phenyl silicon dichloride, and copolymerizing the hydrolyzate, whereby a bodied resin is obtained.

5. The method of preparing a siloxane resin which comprises simultaneously coupling methyl and phenyl radicals with silicon as silicon tetrachloride by interaction thereof with methyl and phenyl Grignard reagents whereby a crude reaction mixture is obtained, effecting the coupling at a coupling ratio such that the mol. per cent of phenyl silicon trichloride, based on total phenyl silicon trichloride and methyl phenyl silicon dichloride, is between 10 and 30 mol. per cent, filtering from insoluble magnesium salts, vaporizing silicon tetrachloride and the organosilicon chlorides in which the only organo radicals are methyl radicals from the crude reaction mixture leaving a residue containing the organosilicon chlorides having phenyl substituents therein, mixing methyl silicon trichloride and the residue, hydrolyzing the mixture so obtained in water, and polymerizing the hydrolysis product whereby a bodied oil is obtained.

6. The method defined in claim 5 in which the methyl silicon trichloride is added in amount between 5 and 40 mol. per cent, based on total methyl and phenyl silicon trichloride and methyl phenyl silicon dichloride.

7. The method of preparing a siloxane resin which comprises simultaneously coupling methyl and phenyl radicals with silicon in the form of silicon tetrachloride by the Grignard reaction employing methyl and phenyl Grignard reagents in equimolecular proportions and at a coupling ratio with respect to the silicon tetrachloride to give between 10 and 30 mol. per cent phenyl silicon trichloride, based on total phenyl silicon trichloride and methyl phenyl silicon dichloride, filtering out the magnesium chloride, vaporizing silicon tetrachloride and the silicon chlorides in which the only organo radicals are methyl radicals from the product of the coupling leaving a residue containing the organosilicon chlorides having phenyl substituents therein, hydrolyzing a mixture of the residue and methyl silicon trichloride in amount between 5 and 40 mol. per cent of methyl silicon trichloride based on total methyl and phenyl silicon trichlorides and methyl phenyl silicon dichloride, and polymerizing the hydrolyzate whereby a resin is obtained which may be cured to a non-tacky solid resin by heating.

WILLIAM R. COLLINGS.
HOWARD N. FENN.
HERBERT J. FLETCHER.

(References on following page)

REFERENCES CITED

The following references are of record in the file of this patent:

UNITED STATES PATENTS

| Number | Name | Date |
|---|---|---|
| 2,375,995 | McGregor et al. | May 15, 1945 |
| 2,383,827 | Sprung | Aug. 28, 1945 |
| 2,389,477 | Wright et al. | Nov. 20, 1945 |
| 2,398,672 | Sauer | Apr. 16, 1946 |

OTHER REFERENCES

Hyde et al., Journ. Amer. Chem. Soc., May 1941, vol. 63, pages 1194 to 1196.